April 24, 1928.
W. B. GODDARD
ILLUMINATING MIRROR
Filed Nov. 15, 1926
1,667,545
2 Sheets-Sheet 1
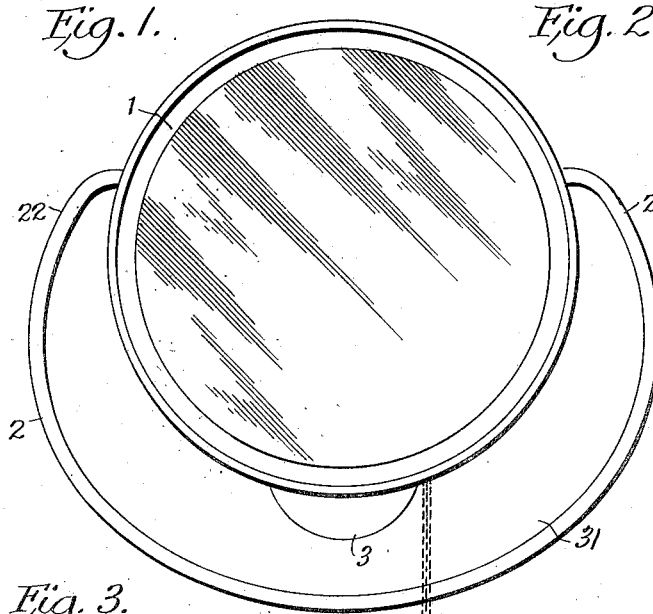
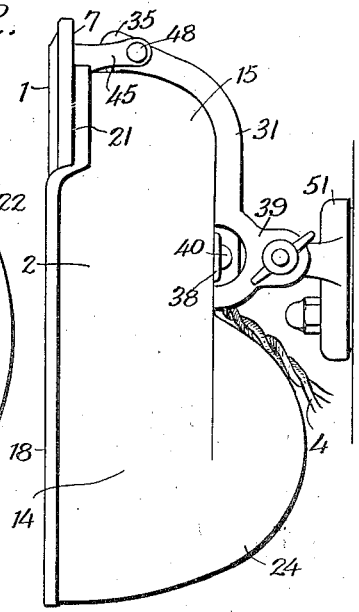
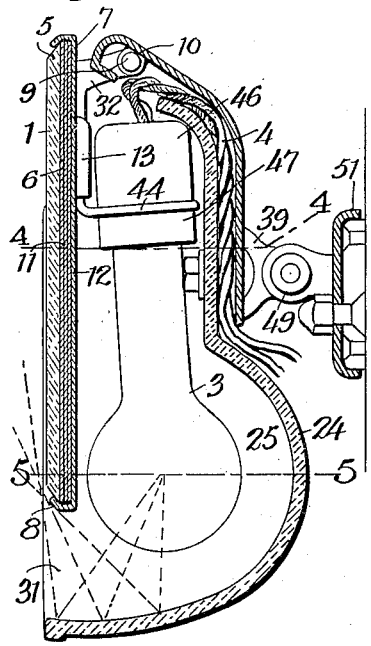
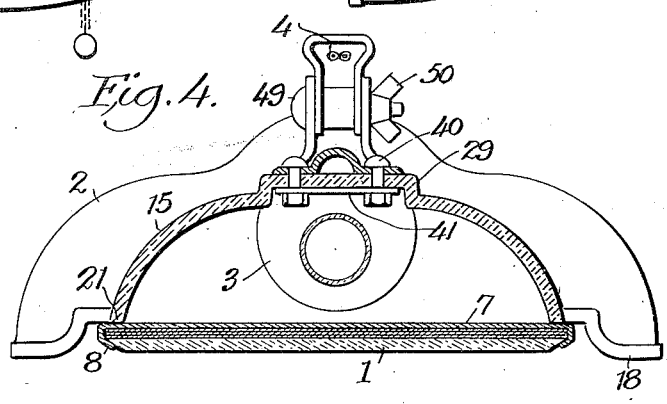
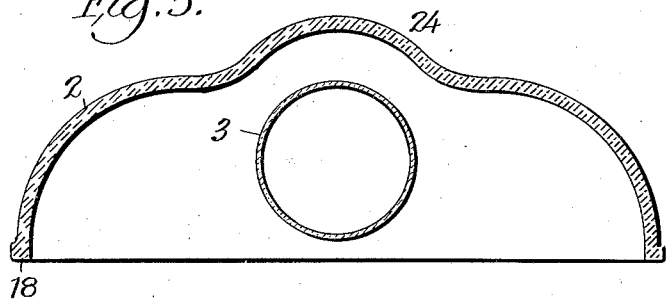
INVENTOR:
Wilfred B. Goddard,
BY
ATTORNEY.

April 24, 1928.
W. B. GODDARD
ILLUMINATING MIRROR
Filed Nov. 15, 1926
1,667,545
2 Sheets-Sheet 2
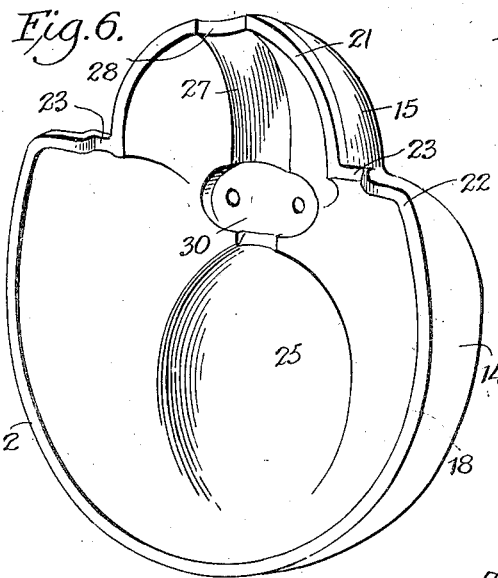
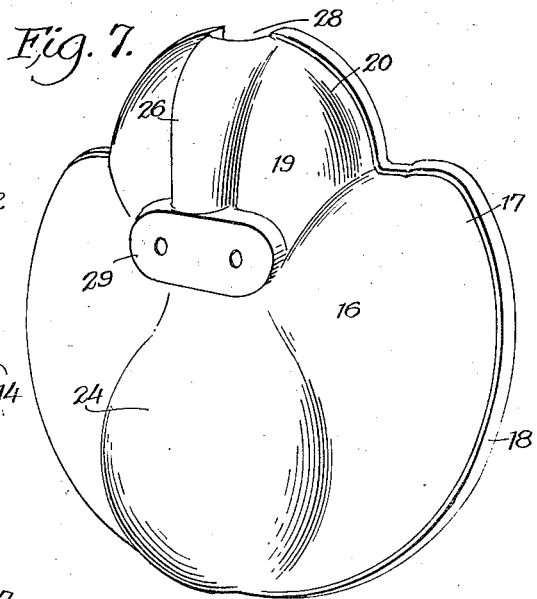
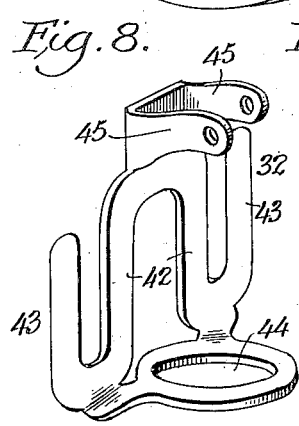
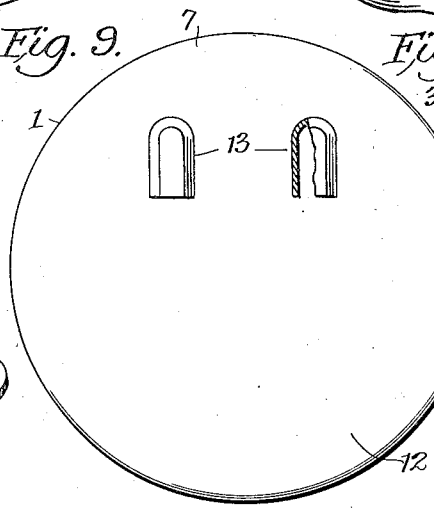
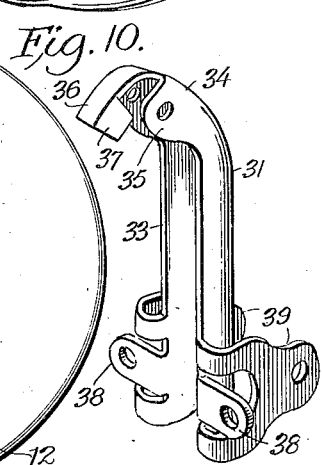
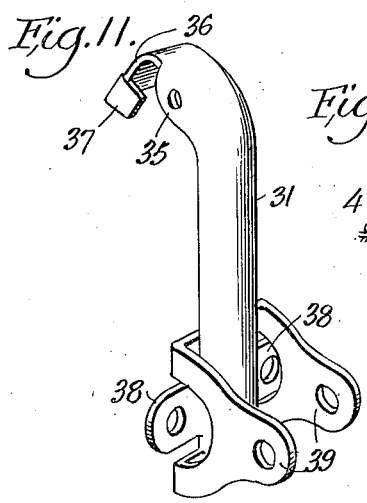
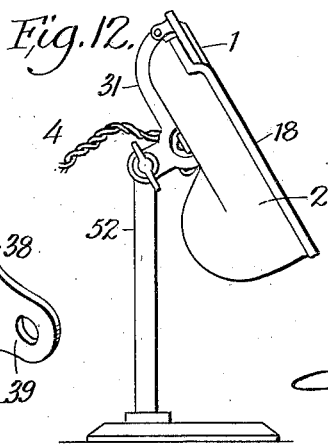
INVENTOR:
Wilfred B. Goddard,
BY
ATTORNEY.

Patented Apr. 24, 1928.

1,667,545

UNITED STATES PATENT OFFICE.

WILFRED B. GODDARD, OF BURLINGAME, CALIFORNIA.

ILLUMINATING MIRROR.

Application filed November 15, 1926. Serial No. 148,535.

This invention relates to illuminating mirrors, and particularly to improvements in mirrors of that type disclosed in my prior Patent No. 1,138,552, dated May 4, 1915, designed for illuminating the face of a person or other object and reflecting the same in a mirror in such manner as to secure a clear and shadowless reflection without glare or objectionable concentration of light upon the face of the person or upon the object being reflected.

One object of the invention is to provide an illuminating mirror and a light reflecting and diffusing casing containing a source of light and having a light emission opening between the margins of the mirror and the casing through which light free from glare or shadows will be thrown upon the face of a person or object to be viewed in the mirror, the casing serving also for transmitting a soft or subdued light substantially throughout its whole extent of surface, thereby producing a device which may be employed as a mirror having peculiar and desirable characteristics as well as a light fixture for general illuminating purposes.

A further object of the invention is to provide a mirror adapted for shaving or other toilet purposes in which the light emission opening between the margins of the mirror and the casing is so formed and arranged as to reflect the light from the casing upon the lower portion and sides of the face of the person looking into the mirror, and so that the light diffused from the casing and reflected by surrounding objects will illuminate the upper portion of the face of the user, thus preventing any light from directly shining into the eyes of the observer and causing eye strain or other eye distress.

A still further object of the invention is to provide an illuminating mirror with a light reflecting and diffusing casing which will soften the light and permit an electric lamp of comparatively high candle power to be used as a source of illumination without causing shadows or glare.

A still further object of the invention is to provide an illuminating mirror so constructed as to protect and prevent injury to the reflecting surface or backing of the mirror from the heat of the electric lamp and which will dissipate the heat so as to prevent fogging of the mirror or undesirable heating of any of the parts of the device.

A still further object of the invention is to provide a highly ornamental and attractive type of illuminating mirror which may be either of portable or stationary type and constructed to be mounted upon a wall or other vertical surface or to be supported upon a table, stand or other horizontal surface, and in which the various assembly elements are of unitary type, enabling the parts to be stored or shipped with great facility and the article to be easily, conveniently, readily and economically made by assemblage of the unitary parts.

A still further object of the invention is to provide an illuminating mirror which may be employed as a mirror and also as a light reflector, and in which the mirror frame forms a rear reflector for concentrating the light upon the reflecting and diffusing casing so as to secure a high degree of efficiency of light reflecting and diffusing actions.

A still further object of the invention is to provide a novel construction of light reflecting and diffusing casing which, in addition to performing the several functions described, constitutes an ornamental part of the device.

The invention consists of the features of construction, combination and arrangement of parts, hereinafter fully described and claimed, reference being had to the accompanying drawings, in which:—

Figure 1 is a front view of an illuminating mirror embodying my invention.

Figure 2 is a side elevation thereof as employed as a wall mirror and light fixture.

Figure 3 is a vertical section taken centrally from front-to-rear through the device.

Figure 4 is a horizontal transverse section on line 4—4 of Figure 3.

Figure 5 is a horizontal transverse section on line 5—5 of Figure 3 omitting the mirror.

Figure 6 is a front perspective view of the casing per se.

Figure 7 is a rear perspective view thereof.

Figure 8 is a perspective view of the lamp and mirror carrying bracket.

Figure 9 is a rear elevation of the mirror.

Figures 10 and 11 are front and rear perspective views of the casing carrier bracket.

Figure 12 is a view showing the device as adapted for use as a portable mirror and light fixture.

The device comprises as essential elements a mirror 1, a casing or housing 2, and a source of illumination 3, such as an electric lamp, disposed in said casing or housing. A conducting cord 4 is suitably connected with the terminals of the lamp and is designed in practice to lead therefrom to any suitable source of electric current supply.

The mirror 1 is preferably made of glass and may be of circular, oval or other suitable outline form. It is provided with a beveled front marginal edge 5 and with a light reflecting coating 6. A backing or frame plate 7 carries the mirror glass and is disposed upon the rear face thereof and provided with a marginal bead or flange 8 which is bent over so as to partially overlap the beveled margin 5. Arranged between the back of the mirror glass and the body of the backing or frame plate 7 are layers 9 and 10, respectively, of insulating fibre or other suitable insulating material, which lie in contact with the mirror coating 6 and inner or front face of the backing plate 7, and between which insulating layers 9 and 10 is interposed a layer 11 of a heat non-conducting material, such as asbestos. The plate 7 is made preferably of sheet aluminum or other bright, non-tarnishing metal, the outer face of which is properly finished or polished to provide a rear reflecting surface 12. Formed on or applied to the rear face of the plate 7 is a pair of spaced socket members 13, closed at their upper ends and open at their lower ends, and adapted for engagement with the mirror and lamp carrier bracket, as hereinafter described. When the device is in use, the metallic backing plate 7, which is a good heat conductor, absorbs a large proportion of the heat from the lamp 3, such heat producing an induced circulation of air upward through the casing and between the same and the back of the mirror, whereby the heat will be readily dissipated, the backing plate serving in this connection as a highly efficient heat collector and dissipator. The purpose of the non-conducting layers 9, 10 and 11 between the mirror glass and the mirror backing plate is to prevent any material amount of this heat from being transmitted to the mirror glass, this insulating action and the dissipation of the heat preventing clouding or fogging of the mirror and ensuring an absolute clearness of the mirror at all times for the faithful reproduction of the image appearing therein and reflected therefrom.

The casing 2 is preferably made of translucent glass, of a white color or other suitable color giving it a mat surface effect, so that it will serve as a light diffuser and as a light reflector of just sufficient reflecting properties to prevent glare or shadows. It is of ornamental shape or formation so as to produce with the mirror and other parts of the device a highly attractive illuminating mirror and light fixture. As shown particularly in Figures 6 and 7, the casing comprises the shell open at the front and consisting of a body portion 14 of major dimensions and a surmounting upper or crown portion 15 of reduced dimensions with respect thereto. The body portion consists of a generally concavo-convex rear wall 16 and a forwardly projected side wall 17, the rim edge 18 of which latter is flat and has all of its portions arranged in a common plane, while the crown portion 15 is semi-dome shaped and comprises a generally concavo-convex rear wall 19 having a forwardly projected side wall 20, the rim edge 21 of which is flat and has all of its surfaces lying in the same plane. The wall 17 of the body portion 14 is curved or extends on a semi-elliptical arc or an arc somewhat greater than a semi-ellipse, while the wall 20 of the crown portion 15, which is centrally positioned with respect to the body portion 14 and relatively narrower than said body portion, is curved or extends on an arc of a circle or ellipse of smaller size. The curvature of the sides of the wall 17 is fairly regular except at their upper or end portions, where they are inturned abruptly, as at 22, and curved rearwardly and cut away to provide shoulders 23 intersecting the base of the marginal edge 21 of the crown portion 15. Except at these points the marginal edge 21 of the crown portion 15, thus providing a recess between the shoulders 23 in the plane of which the rim edge 21 lies so as to form an abutment wall. The body portion 14 is centrally deepened by the provision of a rearwardly bulged portion 24 on its rear wall, thus forming a cavity 25 communicating with the interior of the casing chamber, and the crown portion 15 is provided upon its body wall with a rearwardly projecting hollow rib or boss 26 forming on its inner side a groove or cavity 27, and the rim edge 21 is provided with a notch or recess 28 communicating with the top of this cavity. In the casing is also formed between the cavities 25 and 27 a hollow rearwardly projecting transverse boss 29 forming a cavity 30 which communicates with the adjacent ends of the cavities 25 and 27.

The mirror 1 is supported at the front of the casing substantially in alinement with or somewhat in rear of the rim edge 18 and so as to form with the marginal portion of the wall 14 a light emission opening 31 which extends partially but not wholly around the mirror, as hereinafter described. For connecting and supporting the mirror, casing and lamp in proper relative positions, and mounting the device upon a wall bracket, standard or other suitable support, carrier brackets 31 and 32 are employed. The bracket 31, which I term the casing carrier bracket, comprises a U-shaped or channeled metal body 33 having an upwardly and forwardly curved end portion 34 formed with apertured ears or hinge knuckles 35 and a downwardly and forwardly turned retaining and guide tongue 36, provided with spaced clamping and guide plates or lugs 37, while at its lower end the bracket 31 is provided with laterally extending apertured attaching arms 38 and rearwardly projecting apertured bracket arms 39. The channeled body portion 33 of this bracket 31 receives and embraces the rib or boss 26 at the rear of the upper part of the casing, and its tongue 36 extends into and overhangs the notch or recess 38, against the wall of which the clamping and guide lugs 37 bear, the bracket thus having a clamping engagement with the top of the casing, while the attaching arms 38 bear upon the rear face of the boss 29, which boss is apertured for the passage of securing bolts 40 which pass through the openings in the arms 38, the openings in the wall of the boss 29 and through openings in a clamping plate 41 seated in the recess 30, whereby the lower end of the bracket 31 is fixed to the casing. The mirror and lamp carrier bracket 32 comprises an inverted U-shaped flat metal body portion 42 provided at its opposite sides with upstanding holding prongs or arms 43, at its base with a right angularly projecting holding ring 44, and at its top with a pair of right angularly projecting apertured hinging arms 45. The prongs 43 of this carrier bracket are adapted to receive and engage the socket members 13 on the back of the mirror, for detachably supporting the mirror in position, while the ring 44 is adapted to lie between the lamp socket 46 and a clamping ring 47 in threaded engagement with the lamp socket, whereby the bulb receiving base or socket of the lamp may be hung suspended in the casing chamber between the rear wall of the casing and the back of the mirror. The arms 45 of the bracket 32 are arranged to overlap the hinge members 35 of bracket 31, and a bolt or screw 48 passes through said arms and hinge members and detachably and pivotally connects them together. The arms 45 are so arranged as to be received in the notch or recess 48 when the mirror is disposed in normal position as shown in Figures 1 and 3, thus allowing the mirror to come into the space between the shoulders 23 and to bear against the abutment rim 21, whereby it is supported firmly in its normally downturned or working position. In such position also the lamp socket and stem of the lamp bulb are received partially in the cavity 27 and lie snugly between and in spaced relation to the mirror and back wall of the casing, while the enlarged portion of the lamp bulb is partially received in the cavity 25 and spaced from the mirror and back wall of the casing, allowing a lamp of comparatively large size and candle power to be received without touching the mirror or casing and transmitting an undue amount of heat thereto. As the lamp is carried by the hinged bracket 32 which supports the mirror, both the mirror and the lamp may be swung up as a unit to or above a horizontal position so as to permit ready and convenient access to the casing for cleaning or adjustment of parts and to the bulb to allow a new bulb to be substituted for a burned out one. The detachable connection between the mirror and the bracket furthermore permits removal of the mirror for still greater convenience of access to the casing or to allow convenient cleaning of the mirror and repolishing of its surface 12 whenever necessary. It will, of course, be understood that the friction of hinge 48 may be such as to hold the mirror and lamp supported, when elevated, against dropping by gravity while cleaning, adjustments or replacements are being made. It will be observed that the lamp cord 4 extends from the lamp to the exterior between the lugs 37 and through the channel 33 of the bracket 31 and between the same and the boss 26, which parts provide a guideway to permit such running motion of the cord as may be necessary in the swinging motions of the mirror and lamp and to adapt the cord to pass into the casing in such manner as to be concealed from view at its point of entry and to be out of the way of the movable parts of the device.

From the foregoing description it will be apparent that the mirror is supported so as to lie within the front of the chamber of the body 14 of the casing and rest at its upper portion against the seat face 21 of the top or crown portion 15 of the casing, a part of the mirror, which may be from one-fourth to one-third more or less, of its body, measured with regard to its vertical diameter, extending above the horizontal line of the top of the casing body, while the remainder of the mirror is bounded by, and its marginal edge below said line is arranged in spaced relation to, the marginal rim edge 18. The light emission opening formed by these marginal edges thus extends around a predetermined portion of the circumference of the mirror, to wit, in the example shown, around its base and upwardly about its sides to a point above its horizontal transverse center on an arc which is eccentric to the mirror axis. The light from the lamp 3 will, therefore, be cast outward so as to be thrown or reflected by the concaved reflecting surfaces formed by the bottom and sides of the casing body 14 upwardly and inwardly against the lower portion and sides of the face of a person looking into the mirror, the projection of light at the front of the casing above the line of the ends of the arcuate light emission opening and line of the eyes of the person looking into the mirror being blocked or cut off by the upper part of the mirror. Thus rays of light directed from all sides of the mirror upon the face of the person, and particularly those coming above the eye level, are prevented, thereby avoiding muscular eye strains such as would be caused by light reflected from all directions falling upon the retina of the eye, especially when the person is shaving or gazing for any material period of time into the mirror. The portion of light thus blocked off is made up or compensated for by the transmission of reflected light from the person's face and the light diffused through the translucent casing and reflected from surrounding objects, causing the whole of the face of the person and entire surface of the mirror to be highly illuminated by a soft light which strongly shows the face of the person without causing shadows, glare or other objectionable illuminating effects producing eye strain. As stated, the casing is made of translucent glass or other translucent material having a mat surface, and consequently the rays of light striking the reflecting surface of the mirror, reflected back against the concaved inner surface of the casing, and reflected outward through the light emission opening by said concaved surfaces, will be light in the form of a soft effulgent glow, giving illuminating brilliancy without shadows or glare. At all times when the lamp is lighted, it will be apparent that a portion of this illumination will be transmitted or diffused through the transmitting casing at the rear and beyond the sides of the mirror, whereby in addition to the result obtained, as above set forth, sufficient light will be produced to adapt the device to serve as a lighting fixture for general illuminating purposes where a low degree of illumination is desired.

The parts of the device are also constructed in unitary formation as to adapt them to be readily and conveniently assembled to form the complete device, thus ensuring strength and stability of construction as well as economy of manufacture.

The device may be mounted as a permanent fixture upon a wall or other support or constructed for use as a portable article. As shown in Figures 2, 3 and 4, the device may be adjustably secured by a pivot and clamping bolt 49 and nut 50, passing through the apertured bracket arms 45, to a suitable type of wall fixture 51, or it may be applied by the same type of fastening means to the upright 52 of a portable stand. The bolt 49 in either case will permit the device to be tilted or adjusted to any convenient angle for use and then secured in adjusted position by means of the nut 50.

Having thus fully described my invention, I claim:—

1. A device of the character described comprising a casing, a mirror, a light emission opening being formed between the casing and the mirror, a lamp disposed between the casing and the mirror, and a unitary support for the mirror and the lamp pivotally connecting both the mirror and the lamp with the casing.

2. A device of the character described comprising a casing, a mirror, a light emission opening being formed between the casing and the mirror, a lamp disposed between the casing and the mirror, and a unitary support for the mirror and the lamp pivotally connecting both the mirror and the lamp with the casing, said support and mirror having interengaging means whereby the mirror is detachably mounted on said support.

3. In a device of the character described comprising a casing, a supporting bracket for the casing, a mirror, a lamp disposed between the casing and the mirror, and a supporting bracket for the mirror and the lamp pivotally connected with the first-named bracket.

4. A device of the character described comprising an open front casing, a supporting bracket for and secured to the casing, a second bracket hinged or pivoted to the first-named bracket and overlying the open front of the casing, a lamp carried by the second-named bracket, and a mirror also carried by the second-named bracket and detachably connected therewith.

5. A device of the character described comprising a translucent casing, a supporting bracket for said casing, a second bracket connected with the first-named bracket, a lamp within the casing and supported by the second-named bracket, and a mirror arranged in advance of the lamp and forming with the casing a light emission opening, said mirror being provided with a rear reflecting surface facing the lamp and being mounted on said lamp carrying bracket.

6. A device of the character described comprising a casing, a carrier bracket with which the casing is connected, a second carrier bracket hinged or pivoted to the first-named carrier bracket, said second bracket being provided with a supporting member and a pair of supporting arms, a lamp engaging said supporting member of the second carrier bracket, and a mirror engaging the arms of the second carrier bracket.

7. A device of the character described comprising a casing, a carrier bracket to which the casing is connected, a seond carrier bracket connected with the first carrier bracket and provided with a supporting member and spaced supporting arms, a lamp carried by the supporting ring of the second carrier bracket, and a mirror provided with sockets detachably engaging the supporting arms of the second carrier bracket.

8. A device of the character described comprising a casing, a carrier bracket for supporting the casing, a second carrier bracket hinged or pivoted to the casing carrier bracket, said second carrier bracket having a supporting ring and a pair of supporting arms, a lamp supported by the supporting ring of the second carrier bracket, and a mirror having sockets detachably engaging the supporting arms of the second carrier bracket.

9. A device of the character described comprising a casing a channeled carrier bracket for supporting the casing, a second carrier bracket connected with the first carrier bracket, a lamp mounted on the second carrier bracket, a mirror mounted on the second carrier bracket, and a conductor leading to the lamp through the channel of the channeled carrier bracket.

10. A device of the character described comprising a mirror, a casing, a source of light in rear of the plane of the mirror and between the same and the casing, the mirror and casing having marginal portions forming a light emission opening, said opening extending on a curved line partly but not wholly around the marginal surface of the mirror.

11. A device of the character described comprising a mirror, a casing, the casing and the mirror having marginal portions spaced to form a light emission opening extending around the bottom and sides of the mirror to a point above the horizontal center of the mirror but terminating below the top of the mirror, and a source of light in the casing.

12. A device of the character described comprising a casing consisting of a shell-like body open at the front, a mirror disposed in the open front of the casing and closing the same for a distance below the top of the mirror, the remainder of the casing and the mirror having their marginal portions spaced to form a light emission opening between them, and a source of light in the casing and in rear of the mirror.

13. A device of the character described comprising a shell-like light diffusing body of translucent material presenting a light reflecting surface of mat tone or color, a mirror disposed in the open front of the casing and closing the same for a distance below the top of the mirror, the remainder of the casing and the mirror having their marginal portions spaced to form a light emission opening between them, and a source of light in the casing in rear of the mirror, the mirror having a reflecting surface facing said source of light.

14. A device of the character described comprising a light diffusing and reflecting casing formed of a shell-like body open at the front, said casing having a body or bowl portion presenting a rim edge extending on an arc of major diameter and a top or crown portion presenting a rim edge extending on an arc of less diameter, the said edge of the crown portion lying in rear of the rim edge of the bowl portion, a mirror disposed at its upper portion between the ends of the rim edge of the bowl portion of the casing and closing the front of the crown portion of the casing, the remainder of the mirror having its rim portion spaced from the rim edge of said bowl portion to provide a light emission opening between the same, and a source of light in the casing and behind the mirror.

15. A device of the character described comprising a shell-like translucent light diffusing and reflecting casing open at the front and consisting of a body or bowl portion having its rim edge extending on a relatively wide arc and a top or crown portion having its rim edge extending on a relatively smaller arc, the rim edge of the crown portion lying in rear of the plane of the rim edge of the bowl portion and intersecting the ends of the latter, a mirror supported with its upper part lying between the ends of the rim edge of the bowl portion and in advance of the rim edge of the crown portion and closing the open front of the latter, the remainder of the mirror having its marginal portion spaced from the rim edge of the bowl portion to form a light emission opening, a bracket fixed to and carrying the casing, a second bracket connected with the first-named bracket and normally lying in the crown portion of the casing, said second bracket forming a support for the mirror, and a lamp in the casing between the casing and the mirror and carried by the second-named bracket.

16. A device of the character described comprising a mirror, a casing, and a source of light between the mirror and casing, there being provided between the casing and the mirror a light emission opening extending about the bottom and sides of the mirror and terminating at each side below the top of the mirror.

17. A device of the character described comprising a mirror, a casing, and a source of light between the mirror and casing, there being provided between the casing and the mirror a light emission opening extending about the bottom and sides of the mirror and terminating at each side substantially on a line between the horizontal transverse center of the mirror and a median line between said line and the top of the mirror.

18. A device of the character described comprising a casing, a source of light within the casing, a mirror, a light emission opening being formed by and disposed between the casing and mirror, said mirror comprising a body of glass having a rear reflecting coating and heat conducting back provided with a reflecting surface facing the source of light, and heat non-conducting material between the mirror coating and conducting back of the mirror.

In testimony whereof I affix my signature.

WILFRED B. GODDARD.